United States Patent [19]
Kälber et al.

[11] Patent Number: 5,540,129
[45] Date of Patent: Jul. 30, 1996

[54] ANTI-SPLINTERING DEVICE FOR SAWING MACHINES HAVING A SAW BLADE

[75] Inventors: Gerhard Kälber; Ralf Kälber, both of Mühlacker, Germany

[73] Assignee: Robert Bosch GmbH, Stuttgart, Germany

[21] Appl. No.: 117,179

[22] PCT Filed: Jan. 13, 1993

[86] PCT No.: PCT/DE93/00015

§ 371 Date: Sep. 10, 1993

§ 102(e) Date: Sep. 10, 1993

[87] PCT Pub. No.: WO93/13920

PCT Pub. Date: Jul. 22, 1993

[30] Foreign Application Priority Data

Jan. 14, 1992 [DE] Germany ............ 42 00 713.5
Mar. 17, 1992 [DE] Germany ............ 9203580 U
Aug. 24, 1992 [DE] Germany ............ 42 27 765.5

[51] Int. Cl.⁶ .................................................. B27G 19/10
[52] U.S. Cl. .................. 83/447; 83/450; 83/823; 83/828; 83/829; 30/374
[58] Field of Search .................... 83/447, 449, 450, 83/821, 823, 824, 825, 826, 827, 828, 829; 30/371, 373, 374, 375

[56] References Cited

U.S. PATENT DOCUMENTS

| | | | |
|---|---|---|---|
| 1,207,764 | 12/1916 | Johnson | 83/447 |
| 2,125,919 | 8/1938 | Harris | 83/447 |
| 2,542,524 | 2/1951 | Hobbs | 83/447 X |
| 2,854,043 | 9/1958 | Raymond | 30/376 |
| 2,996,089 | 8/1961 | McCarty | 30/374 |
| 3,038,508 | 6/1962 | Wilson | 83/447 X |
| 3,623,518 | 11/1971 | Nicotra | 30/374 |
| 4,563,928 | 1/1986 | Salomonsson | 83/821 |

FOREIGN PATENT DOCUMENTS

| | | |
|---|---|---|
| 0259716 | 3/1988 | European Pat. Off. |
| 380356 | 9/1964 | Switzerland |

*Primary Examiner*—Rinaldi I. Rada
*Assistant Examiner*—Raymond D. Woods
*Attorney, Agent, or Firm*—Michael J. Striker

[57] ABSTRACT

An anti-splintering system for sawing machines having a saw blade with a plurality of teeth, has components including an anti-splintering device positionable on a workpiece laterally from the saw blade in pressure contact with the latter in the region of the teeth, and at least one positioning device connectable to the sawing machine and supporting the anti-splintering device for a correct operational arrangement of the anti-splintering device in the event of a change in at least one of a cutting depth and an angle of inclination of the saw blade.

19 Claims, 13 Drawing Sheets

ANTI-SPLINTERING DEVICE FOR SAWING MACHINES HAVING A SAW BLADE

BACKGROUND OF THE INVENTION

The present invention relates to an anti-splintering device for sawing machines having a saw blade.

More particularly, it relates to an anti-splintering device which can be arranged laterally from the saw blade and is in pressure contact with the latter in the region of the teeth of the saw blade emerging from the workpiece.

In an apparatus for dividing metal-laminated webs into individual boards, as is described for example in EP 259,716, the anti-splintering device adopts an unchanged position relative to the saw blade. Thereby, especially in the event of a change in the cutting depth, no functional interaction between the anti-splintering device and the saw blade is guaranteed. As a result of this, the cut edge of the material is not clean and so has to be refinished.

SUMMARY OF THE INVENTION

Accordingly, it is an object of the present invention to provide an anti-splintering device for sawing machines, which avoids the disadvantages of the prior art.

In keeping with these objects and with others which will become apparent hereinafter, one feature of the present invention resides, briefly stated, in an anti-splintering device in which at least one positioning device connectable to a sawing machine supports the anti-splintering device for the correct operational arrangement in the event of a change in the cutting depth and/or in the angle of inclination of the saw blade.

When the anti-splintering device is designed in accordance with the present invention, it eliminates the disadvantages of the prior art.

It will be recognised that the invention is embodied whenever the anti-splintering device is a member which, in the operating state of the hand-operated circular saw, is actively connected simultaneously both to the workpiece and to the emerging teeth of the saw blade, so that the anti-splintering device exerts a force not only on the Workpiece but also on the saw blade and interacts with a positioning device which ensures that the anti-splintering device adopts the correct operating position. The exertion of force by the anti-splintering device prevents the formation of a gap between the teeth of the saw blade and the anti-splintering device. Since the anti-splintering device rests in close contact on the workpiece in the region of the cut, no gap, which could be regarded as the cause of a ragged cut edge, is formed in this region either. The cutting line also becomes considerably more precise as a result of the suppression or even elimination of vibrations of the saw blade.

If the proposed anti-splintering device is used in sawing machines with a sawing table, it is expedient if the part of the anti-splintering device resting on the workpiece lies in the contact plane defined by the workpiece and the sawing table or projects from the sawing table towards the workpiece. The alternative proposal is particularly suitable when the sawing machine is used to cut uneven workpieces.

Another expedient embodiment envisages that the anti-splintering device is adjustable relative to the saw blade, and can thus be set. This measure, according to the invention, can be used to particular advantage if the hand-operated circular saw is designed as an immersion saw, whose depth of immersion is altered as required. The radial adjustment of the anti-splintering device ensures that the anti-splintering device is always in pressure contact at least with the teeth of the saw blade.

A further expedient embodiment of the invention envisages that the anti-splintering device can be connected to the sawing machine in an articulated manner and pivoted about the spindle of the saw blade or about a spindle extending parallel to that spindle. This measure ensures that the anti-splintering device can be operatively connected to the teeth of the saw blade even when the depth of the immersion of the saw blade changes during the cutting operation. It is further envisaged that the anti-splintering device interacts with at least one spring element, by means of which the pressure of the anti-splintering device acting on the saw blade can be determined. This measure principally takes account of the fact that saw blades of different dimensions can be used in a sawing machine.

Another particularly expedient embodiment envisages that the anti-splintering device has a sensor which is in pressure contact with the body of the saw blade and supports the part which is in pressure contact with the teeth of the saw blade and is designed as an anti-splintering member. These measures considerably reduce the wear on the part which is in pressure contact with the teeth of the saw blade, since the sensor transmits to the saw blade the actual pressure originating from the anti-splintering device, whereas the anti-splintering member, which is actively connected to the teeth of the saw blade, exerts minimal pressure on the saw blade. The sensor, which preferably consists of bearing material, simultaneously serves as a vibration damper for the saw blade, so that two advantages are achieved by simple measures: first, the wear on the anti-splintering device is considerably reduced, and secondly the anti-splintering member can consist of a considerably softer material than the sensor.

A further particularly expedient embodiment of the invention envisages that the anti-splintering device can be accommodated in a housing which is detachably connectable to the sawing machine, so that it can readily be replaced if the individual parts of the anti-splintering device are worn.

It is further envisaged that the positioning device has the shape of an arm, which can be pivoted about a spindle which extends parallel to the spindle of the saw blade or is adjustable along a curve which lies in a plane extending perpendicularly to the spindle. In this arrangement, these measures can also be taken in such a manner that the anti-splintering device has the shape of a section of a cylinder, is rotatable about its spindle and consists of a cuttable material. In the context of this concept of the invention, it is particularly advantageous if the pivot spindle of the arm is at a distance from the spindle of the saw blade which corresponds to the radius of the cylindrical anti-splintering device. The anti-splintering device is always arranged in the region of the teeth of the saw blade emerging from the workpiece. It is uniformly worn from its working side. Finally, provision is made for the radial outside of the anti-splintering device to fall away towards the saw blade. As a result, the operationally correct contact of the anti-splintering device is ensured, even when the saw blade forms an acute angle with the plane of the workpiece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
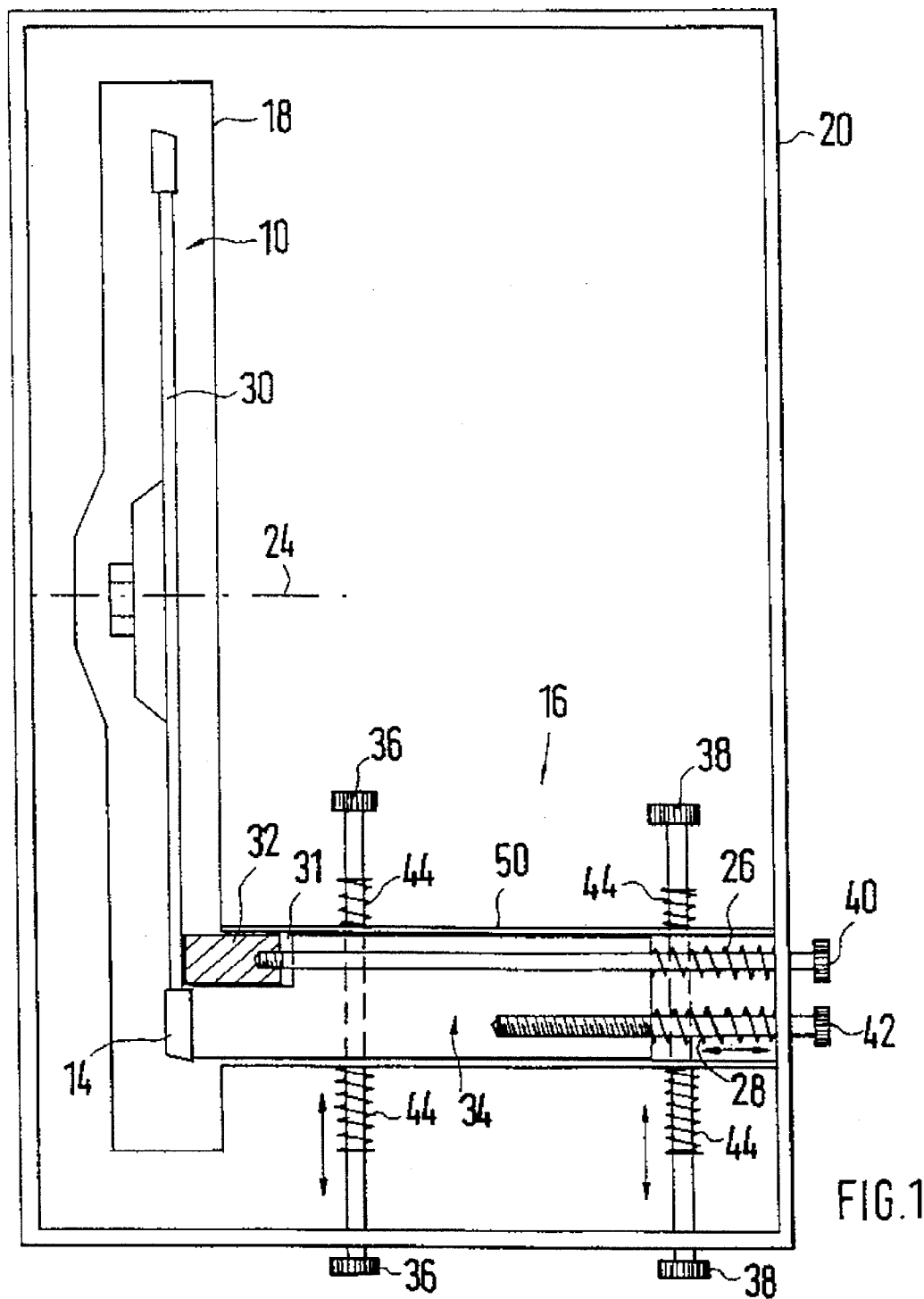
FIG. 1 shows part of a sawing machine in vertical plan view with an anti-splintering device.

FIG. 1 shows part of a sawing machine with a saw blade 10 and anti-splintering device 16. The anti-splintering device 16 can be operationally connected to the sawing machine, can be rested on a workpiece (not shown) and can be arranged laterally from the saw blade 10 and in the region of the teeth 14 of the saw blade emerging from the workpiece. Formed in the sawing table 20 of the sawing machine is a saw-blade passage 18 in which the saw blade 10 is mounted to rotate about the spindle 24. The anti-splintering device 16 is so designed that it is in pressure contact with the emerging teeth 14 of the saw blade. The anti-splintering device 16 is, moreover, so designed that its part 34, which can be rested on the workpiece, lies in the contact plane defined by the workpiece and the sawing table 20 or projects from the sawing table 20 towards the workpiece. The anti-splintering device 16 is accommodated in the housing 15, whose radial position can be determined by the screws 36 and 38. Since there is no rigid connection between the set-screws 36, 38 and the housing 50, spring elements 44 are provided which exert pressure on the housing 50.

Figure 2:
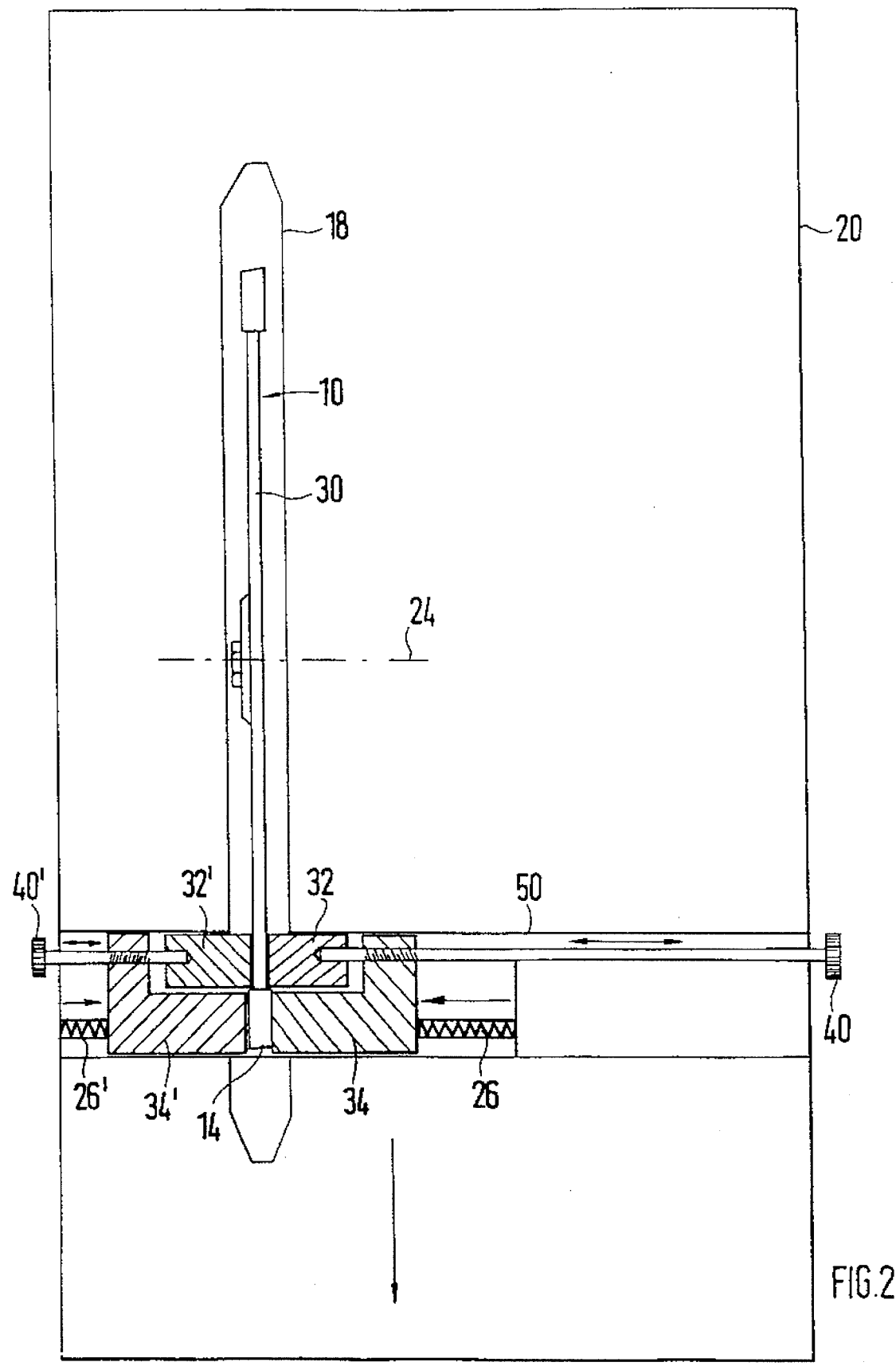
FIG. 2 shows a sawing machine with a further anti-splintering device.

The anti-splintering device 16 further possesses a sensor 32, which is in pressure contact with the body 30 of the saw blade, and the part 34 which is in pressure contact with the teeth 14 of the saw blade and is designed as an anti-splintering member. It will be recognised that the sensor 32 and the anti-splintering member 34 are adjustable in the axial direction of the saw blade 24 and thus can be set. The anti-splintering member 34 is adjustable relative to the sensor 32, the sensor 32 being designed as a dog of the anti-splintering member 34. In the initial position, that is to say before the anti-splintering device becomes operational, a gap 31 is formed between the sensor 32 and the anti-splintering member 34. If the sawing machine is now switched on, the teeth 14 of the saw blade are actively connected to the anti-splintering member 34, which consists of cuttable material, so that the gap 31 is minimised. In this region, the anti-splintering member is supported on the sensor 32. Further wear on the anti-splintering member 34 arises in practice when wear is caused to the sensor 32, which is in pressure contact with the level section of the body 30. Although both the sensor 32 and the anti-splintering member 34 are each in pressure contact with one spring element, 26 and 28 respectively, the spring element 28 can only press the anti-splintering member 34 against the sensor 32. The sensor 32 and the anti-splintering member 34 can additionally be regulated by set-screws 40 and 42, this regulation taking place towards the spindle 24. FIG. 2 shows that the two sides of the saw blade 10 each interact with one anti-splintering device. In this arrangement, the individual parts of the anti-splintering device are of approximately mirror-image design. The sensor 32', the anti-splintering member 34' and the spring element 26' approximately correspond to the corresponding parts of the other anti-splintering device.

Figure 3:
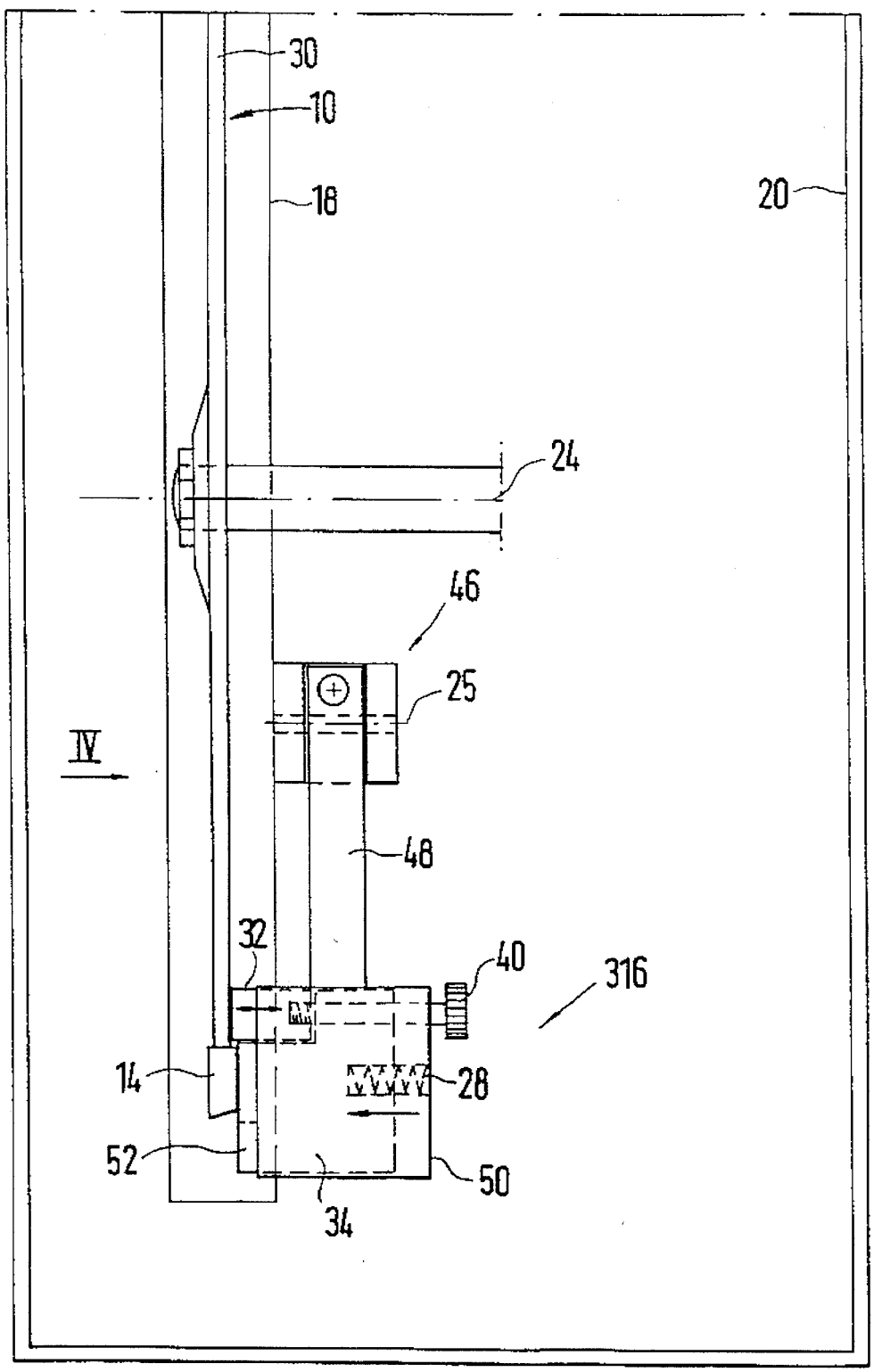
FIG. 3 shows a sawing machine whose anti-splintering device is pivotably mounted.
Figure 4:
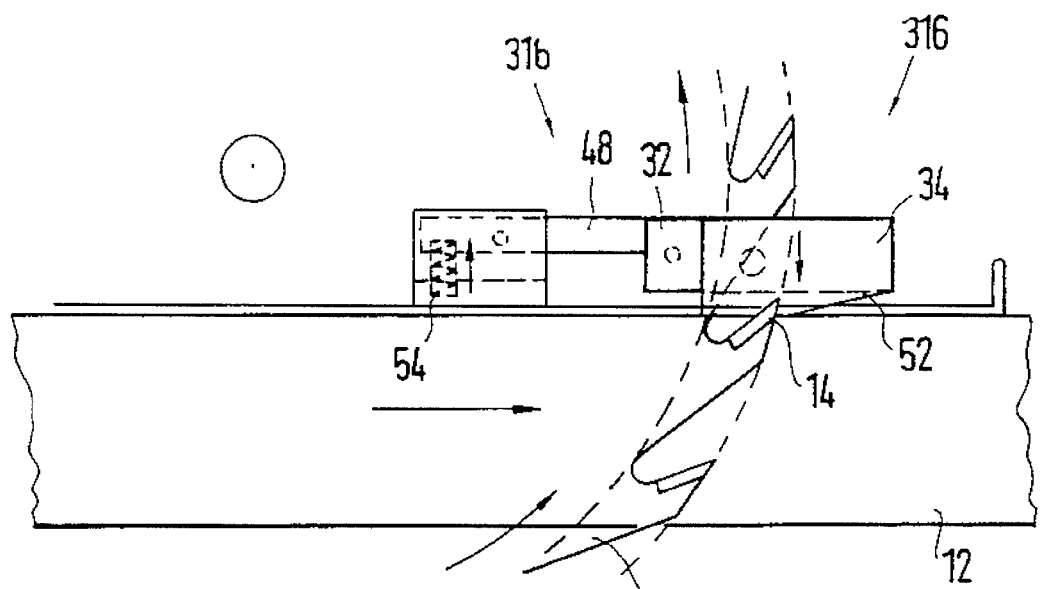
FIG. 4 shows the sawing machine shown in FIG. 3 in the direction of the arrow IV, during the cutting operation.
Figure 5:
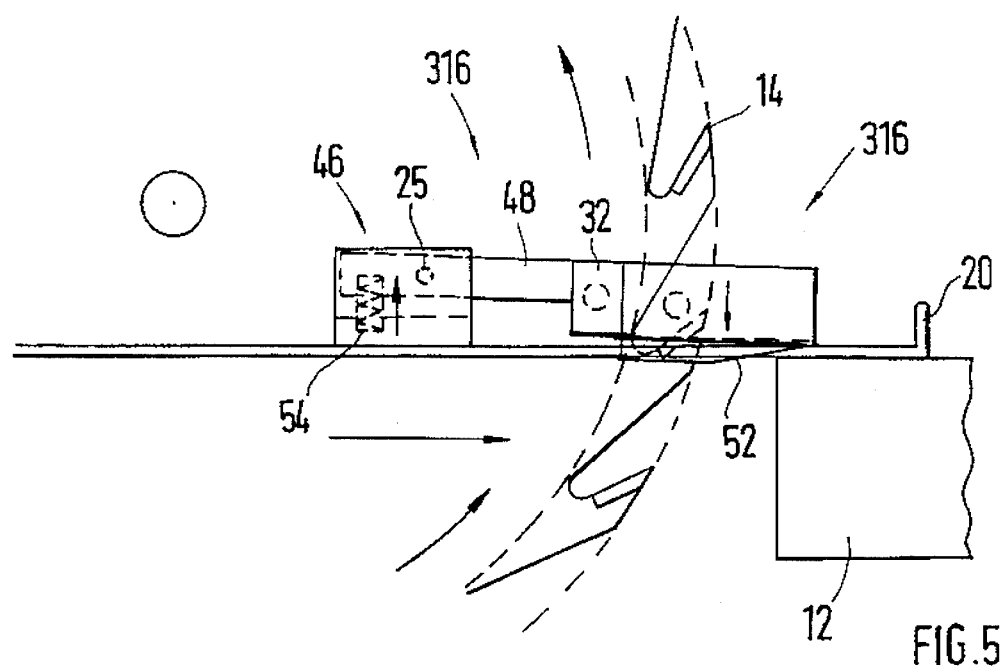
FIG. 5 shows the sawing machine shown in FIG. 4 before the cutting operation.

FIGS. 3 to 5 show an anti-splintering device 316 which can be pivoted, via a joint rod 48 and a joint 46, about a spindle 25. The spindle 25 extends parallel to the spindle 24 of the saw blade 10. Thus, the anti-splintering device 316 can be pivoted in the direction of rotation of the saw blade 10. The sensor 32 and the anti-splintering splintering member 34 are accommodated in a housing 50. As is particularly apparent from FIGS. 4 and 5, the anti-splintering member 34 is further advanced and has an oblique stop surface 52. The joint arm 48 interacts with a compression spring 54, which tends to press the anti-splintering device 316 against the workpiece.

Figure 6:
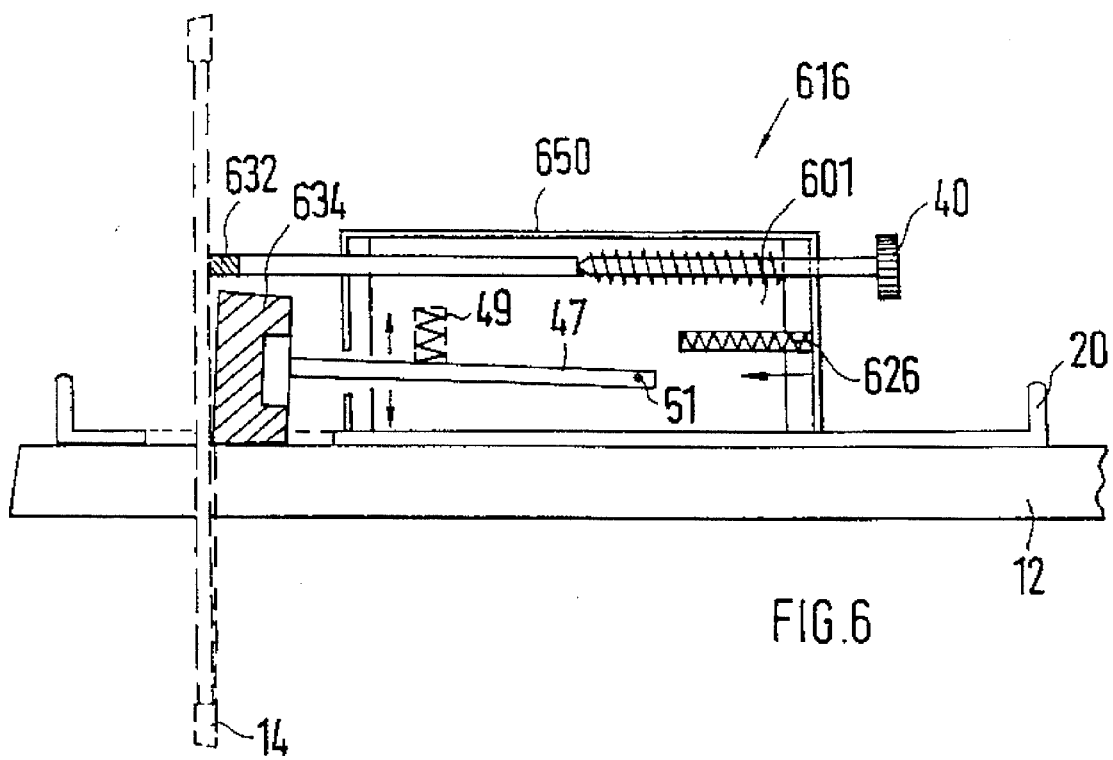
FIG. 6 shows a sawing machine having an anti-splintering device, whose anti-splintering member is pivotably mounted.
Figure 7:
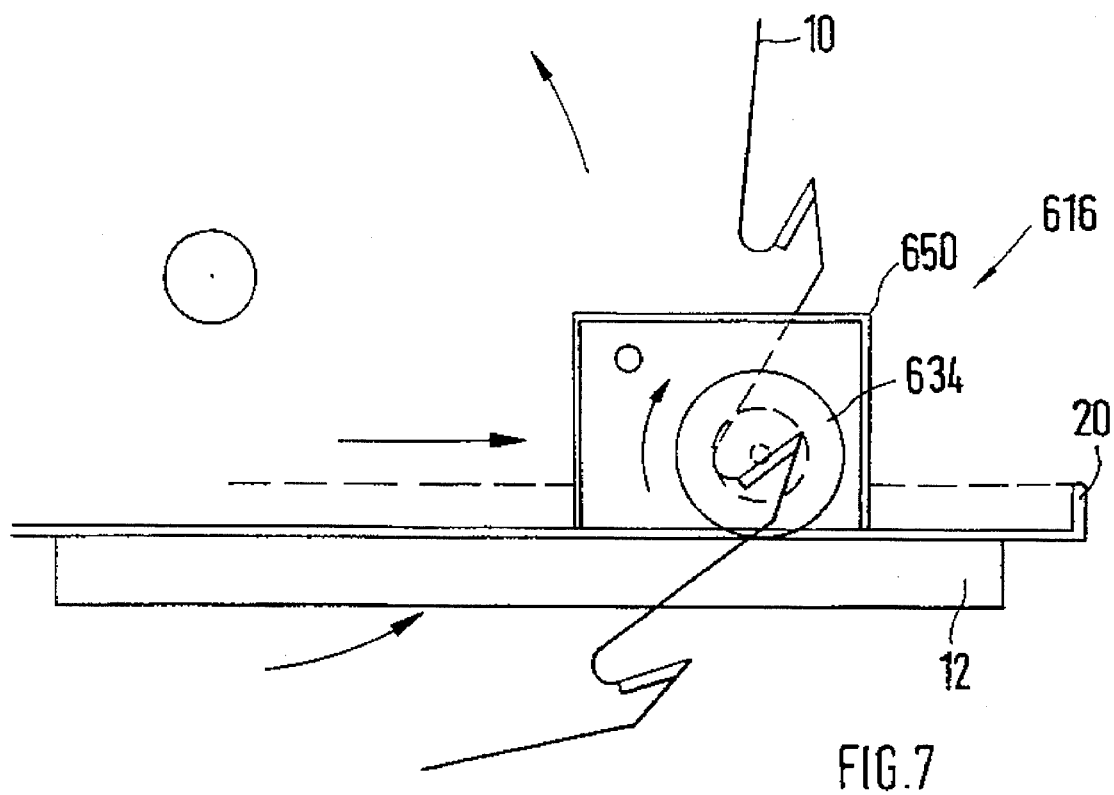
FIG. 7 shows a lateral view of the sawing machine shown in FIG. 6.

FIGS. 6 and 7 show a hand-operated circular saw with an anti-splintering device 616 which is accommodated in a housing 650 and has a sensor 632 and an anti-splintering member 634. Accommodated in the housing 650 is a body 601 which is in pressure contact with the spring element 626 and bears both the sensor 632 and the anti-splintering member 634. The sensor 632 can be set by the set-screw 40, while the anti-splintering member 634 rotatable in an articulated manner to the body 601 and pivoted about the spindle 51. The anti-splintering member 634 is rotatable about the longitudinal axis of the joint arm 47 and pivoted can be in the direction of the arrows. The joint arm 47 interacts with a spring element 49, which tends to press the anti-splintering member 634 against the workpiece 12.

Figure 8:
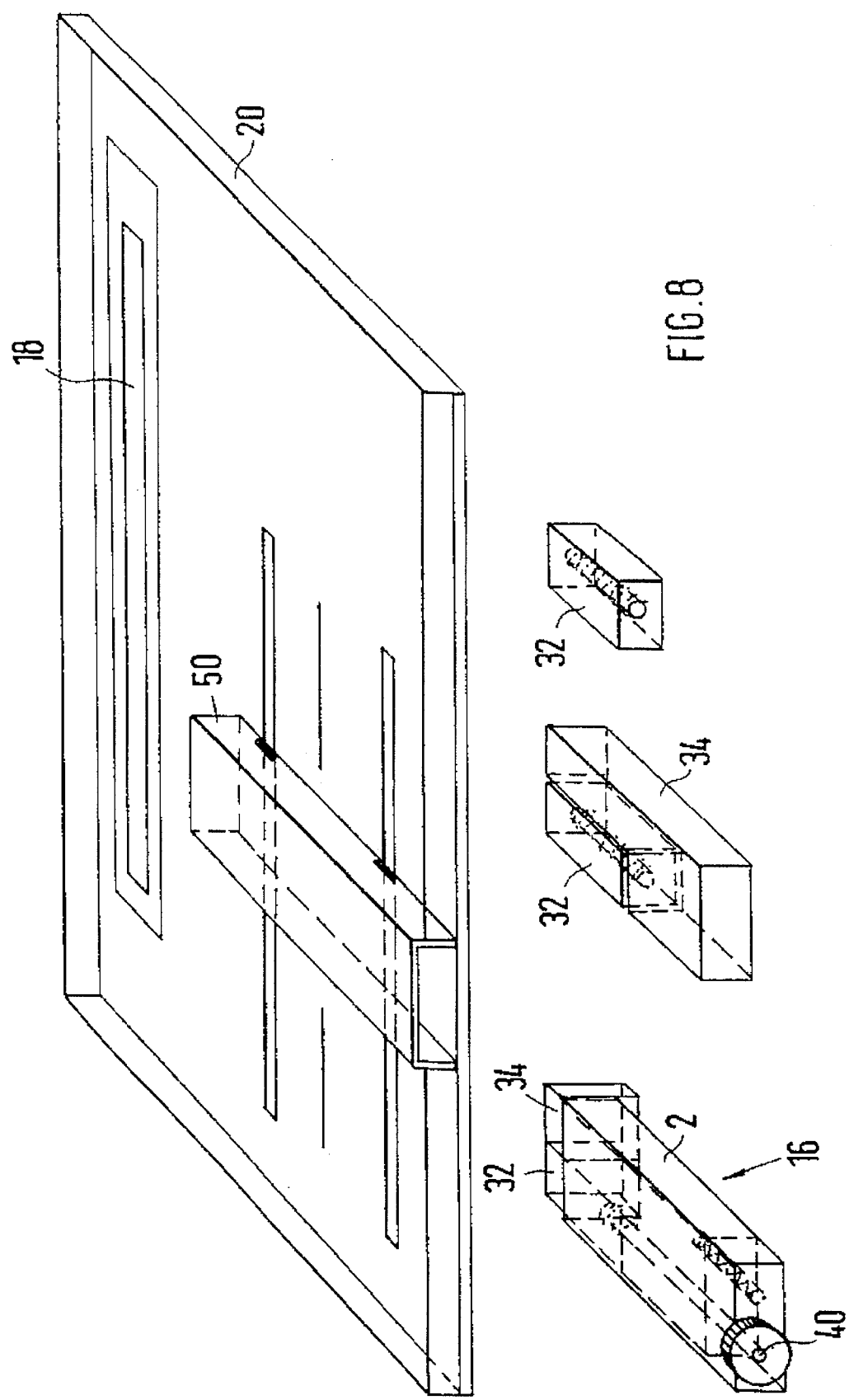
FIG. 8 shows a sawing table with parts of the anti-splintering device.

FIG. 8 shows a sawing table 20 with a saw-blade passage 18 and a housing 50. The anti-splintering device 16, with sensor 32 and anti-splintering member 34, can be introduced into the housing 50. These two parts are, furthermore, accommodated in a further housing 2, so that the insertion of the anti-splintering device 16 into the housing 50 and/or its removal therefrom can take place without difficulty.

Figure 9:
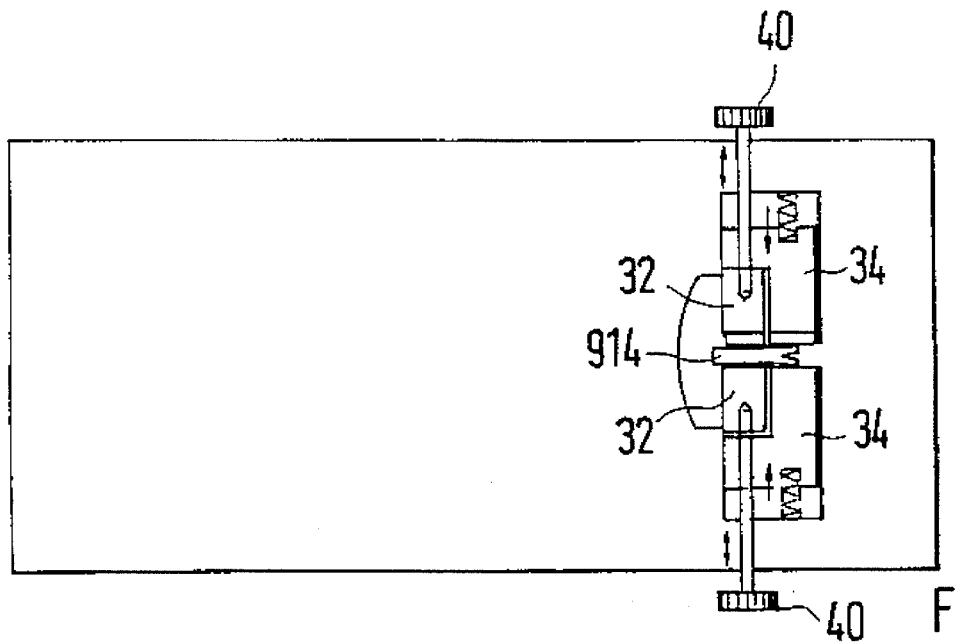
FIG. 9 shows a keyhole saw with anti-splintering device in vertical plan view.
Figure 10:
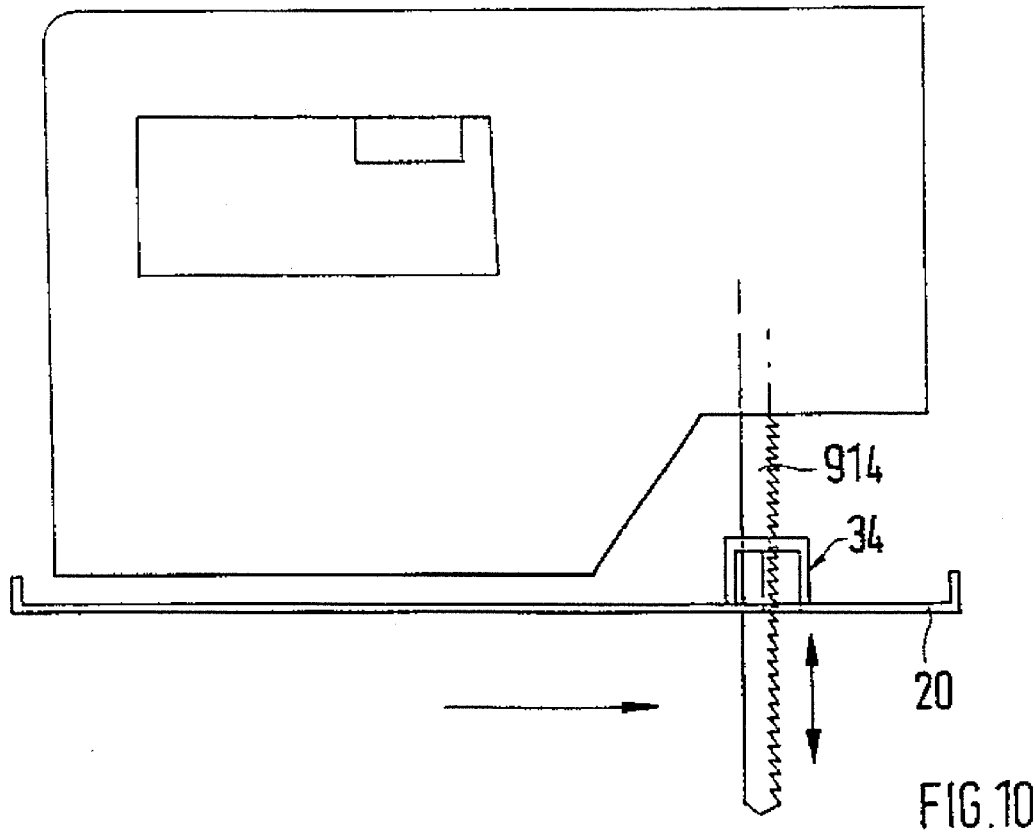
FIG. 10 shows the keyhole saw shown in FIG. 9 in a lateral view.

FIGS. 9 and 10 show that the anti-splintering device can also be used with a keyhole saw, the saw blade 914 performing vertical reciprocal movements.

Figure 11:
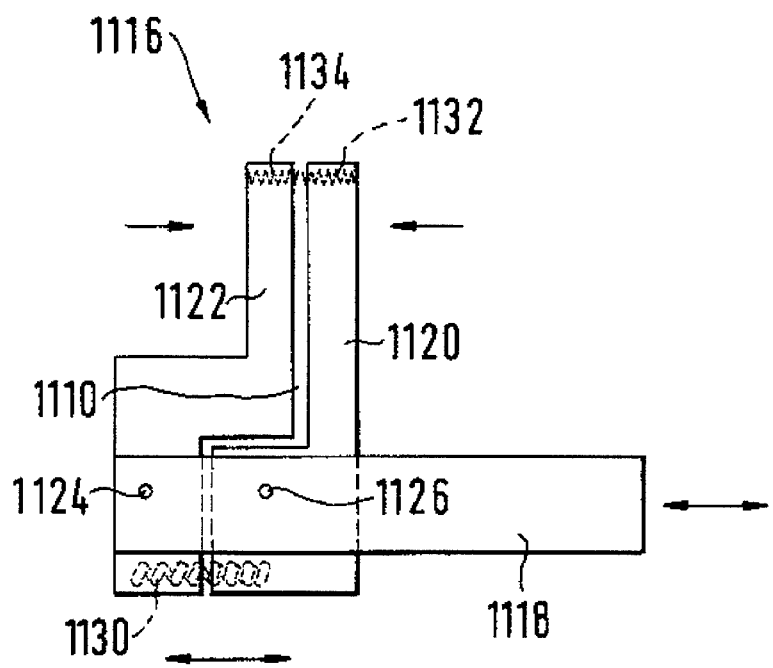
FIG. 11 shows an anti-splintering device designed as a separate part.
Figure 12:
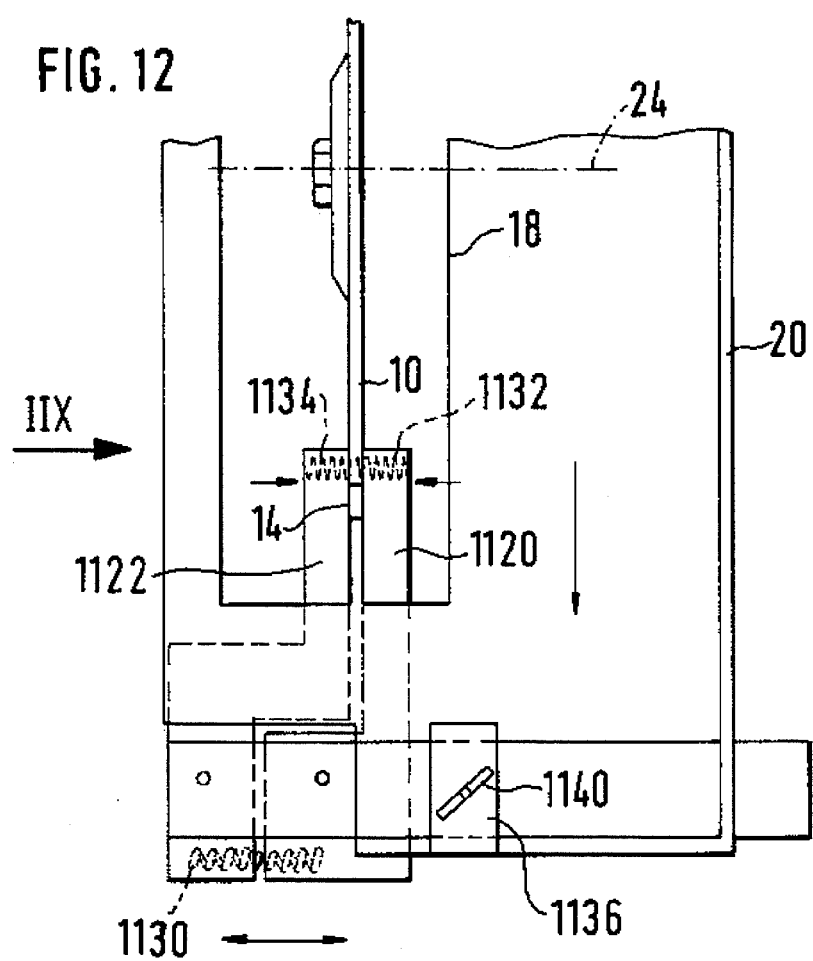
FIG. 12 shows the anti-splintering device shown in FIG. 11 in operational connection with a hand-operated circular saw.
Figure 13:
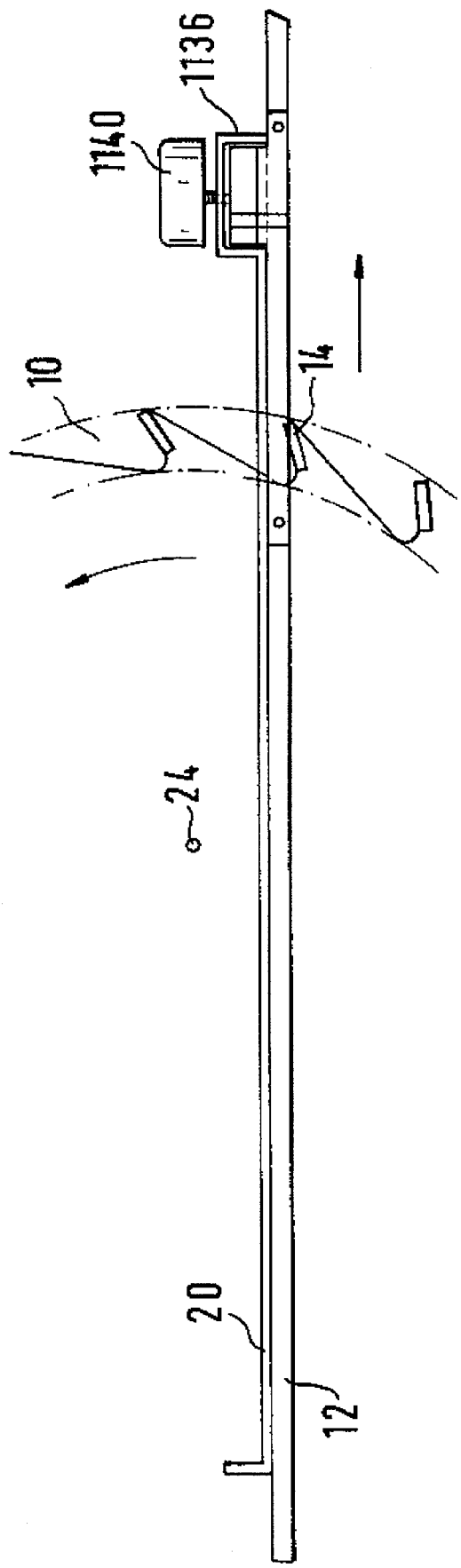
FIG. 13 shows the hand,operated circular saw shown in FIG. 12 in the direction of the arrow XII.

FIGS. 11 to 13 show an anti-splintering device 1116, which is intended as an accessory for hand-operated circular saws and keyhole saws and is hence designed as a separate part. This anti-splintering device 1116 consists of a plug part 1118 with two anti-splintering members 1120 and 1122 which can be positioned laterally from the saw blade 10 and consist of cuttable material, that is to say a material whose hardness is less than that of the teeth of the sawing machine. The anti-splintering members 1120 and 1122 possess, in the region of contact with the saw blade 10, sensors 1132 and 1134 whose hardness is greater than the hardness of the anti-splintering members 1120 and 1122 and which preferably consist of bearing material.

A further feature of the anti-splintering members 1120 and 1122 is that they are articulated on the plug part 1118, this occurring in the regions 1124 and 1126. The ends of the anti-splintering members 1120, 1122 which are remote from the sensors 1132, 1134 interact with a compression spring 1130, which tends to press the sensors 1132, 1134 against the saw blade 10. The special feature of this articulation resides, in particular, in the fact that, as a result of the gap 1120 which is formed between the anti-splintering members 1120, 1122, the two anti-splintering members can be brought independently of each other into pressure contact with the saw blade 10. They are thus, as it were, in floating pressure contact with the saw blade 10 and can therefore follow lateral movements of the saw blade. The sawing machine possesses a plug socket 1136 with a tensioning screw 1140, which serves to fix the plug part 1118. A further special feature of the anti-splintering device 1116 resides in the fact that it can also-preferably be actively connected to guide rails for sawing machines, since its thickness approximately corresponds to the thickness of the guide rails. Thereby the anti-splintering device 1116 can rest in close contact on the workpiece without a gap forming between the saw tooth 14 and the anti-splintering member 1120, 1122, which gap would critically contribute to the formation of splinters in the region of Upper edges of the workpiece.

Figure 14:
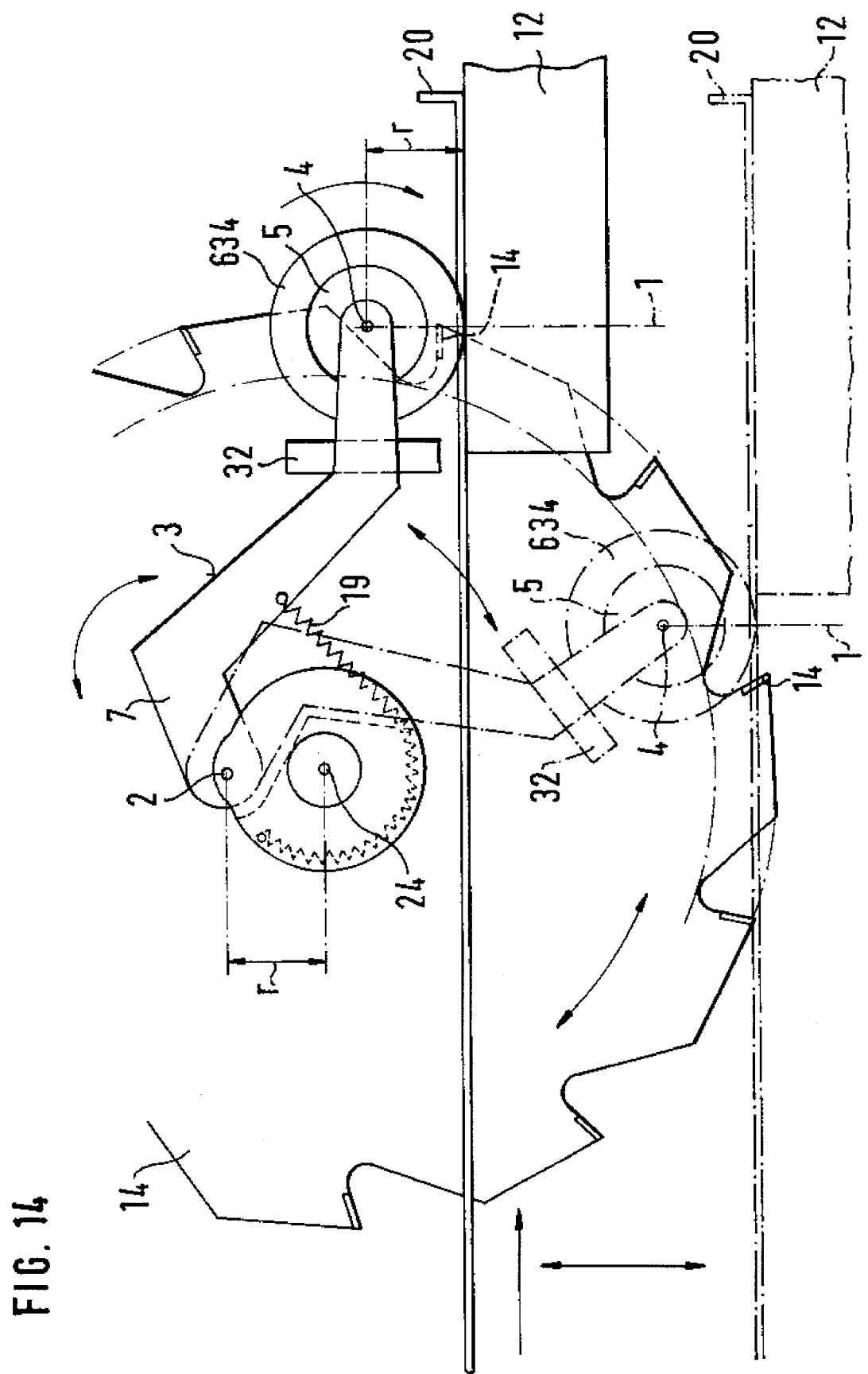
FIG. 14 shows part of a sawing machine in lateral view with a positioning device designed as an arm.
Figure 15:
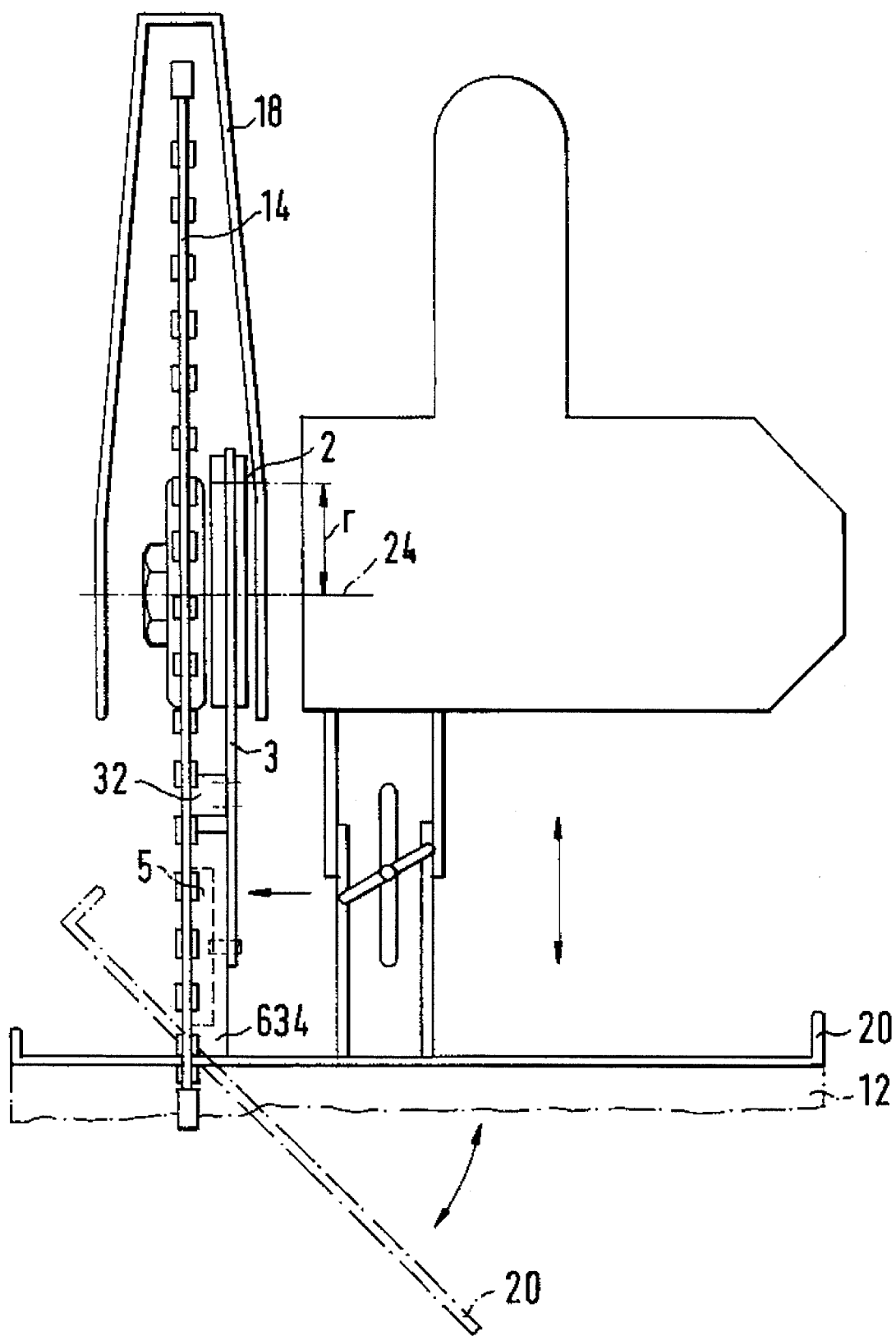
FIG. 15 shows an end-on view of the sawing machine shown in FIG. 14, FIGS. 16 and 17 show part of a sawing machine with two positioning devices.
Figure 16:
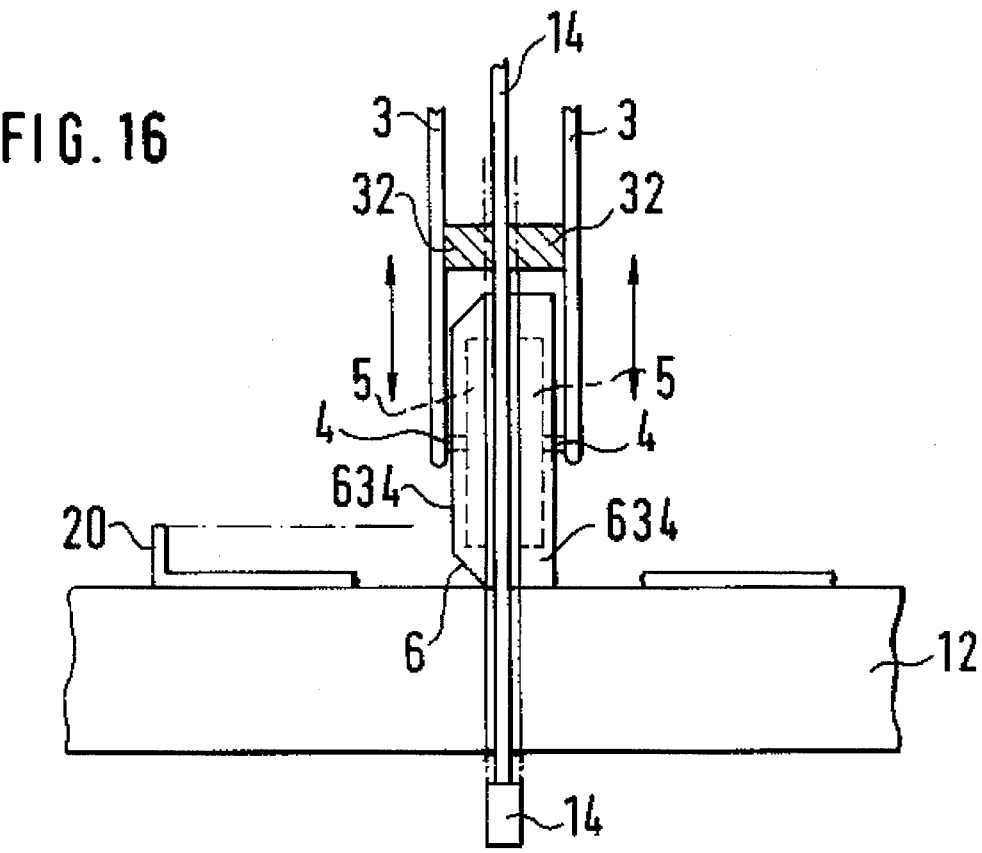

FIGS. 14 to 16 show a cylindrical anti-splintering member 634, which is supported by a positioning device 3 having an arm 7. The arm 7 has two elbows and is articulated at a distance r vertically above the spindle 24 of the saw blade 14. The distance r corresponds to the radius r of the anti-splintering member 634. The result is to ensure that the anti-splintering member 634 always rests on the workpiece 12 precisely where the teeth of the saw blade 14 emerge from the workpiece. When the arm 7 is pivoted, the bearing point of the anti-splintering member 634 moves along a circular path along the circumference of the saw blade 14, and, in so doing, can roll on the workpiece 12. The anti-splintering member 634 has a cylindrical recess 5 which is open towards the saw blade 14, and its circumferential surface 6 falls away towards the saw blade 14 (cf. FIGS. 16, 17). As a result of this measure it is possible, in the case of an anti-splintering member consisting of cuttable material such as plastic, for it to be worn equally by the teeth of the saw blade. In order to minimise the wear on the member 634, a sensor 32 consisting of a bearing material with good slip properties is also provided in this illustrative embodiment. The sensor may consist of bronze, sintered metal or carbon.

Figure 17:
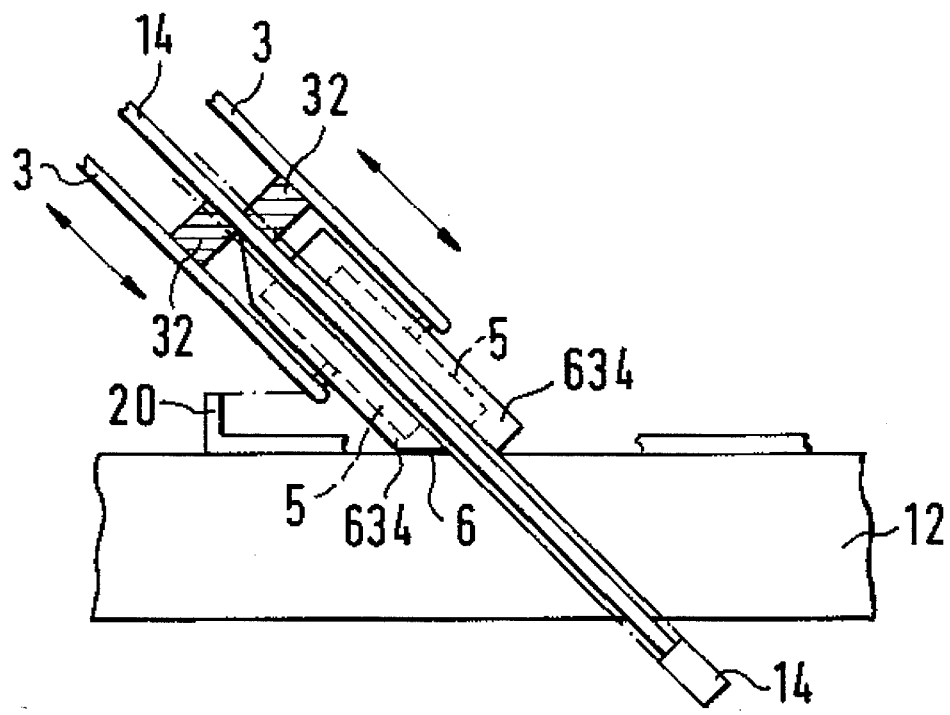

The arm 7 interacts with a tension spring 19, which presses the anti-splintering member 634 against the workpiece 12. Even after adjustment of the sawing table 20 to alter the cutting depth, or after pivoting in order to saw a bevel or an angled cut (see FIGS. 15 and 17), the anti-splintering member 634 always automatically comes to rest at the right point in the region of the teeth of the saw blade 14. FIGS. 16 and 17 show that the saw blade 14 is flanked by an anti-splintering member 634 on each side, these being supported by arms 7 which are arranged parallel but are separate.

Figure 18:
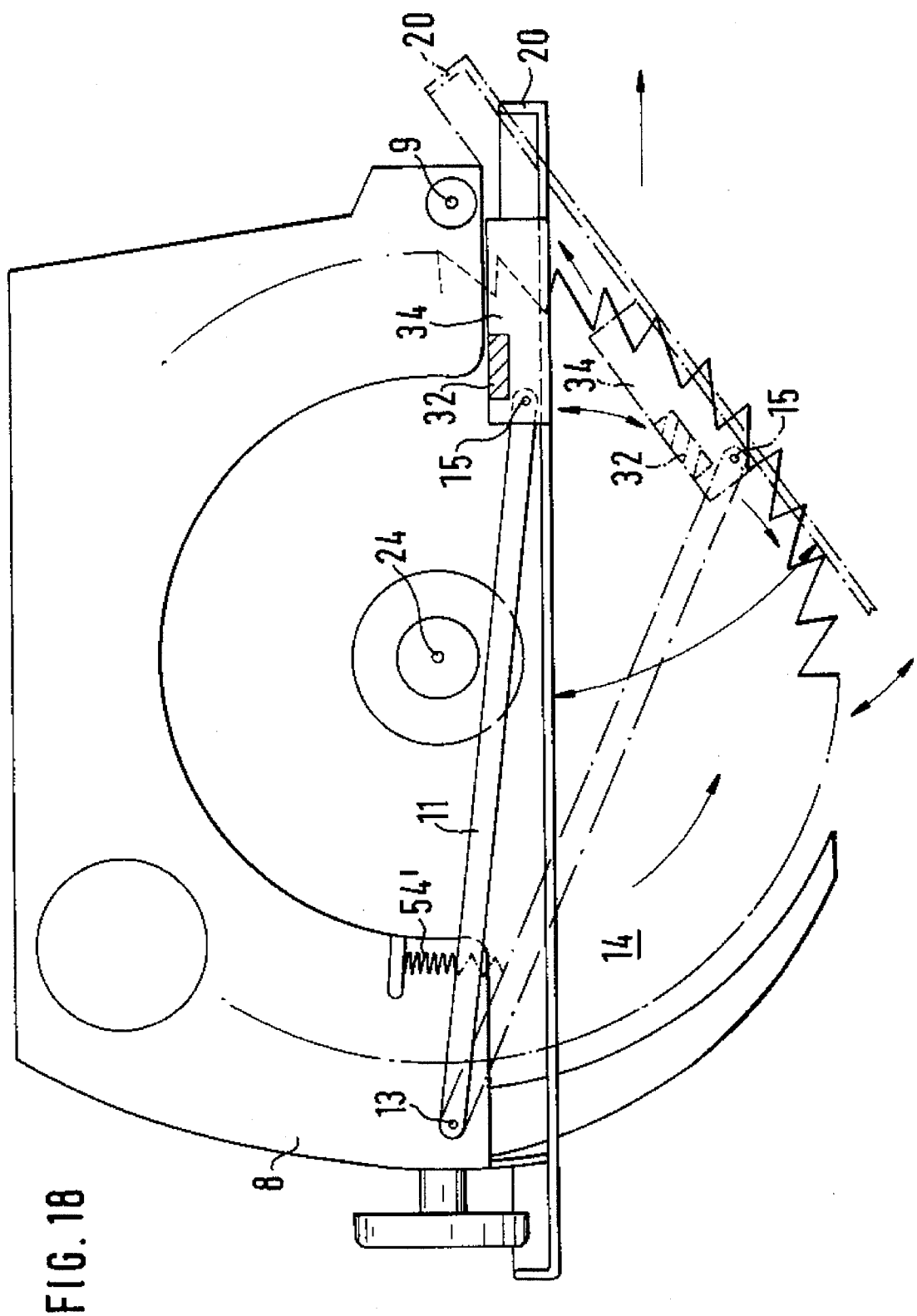
FIG. 18 shows a sawing machine with a pivotable sawing table and a positioning device.

As the illustrative embodiment according to FIG. 18 shows, however, the anti-splintering member 34 can also be of block-shaped design and be articulated on a positioning device designed as a rod 11. This is arranged in the spindle 13 on the housing 8 or on the protective hood of the hand-operated circular saw. The spindles 13, 15 and 24 of the joints run parallel to each other. The surface in contact with the saw blade 14 of the anti-splintering member 34 is clearly greater than, preferably at least about four times as great as, the surface brushed by the teeth of the saw blade 14. Therefore the teeth remain in contact with the anti-splintering member 34 at every cutting depth, that is to say in every position of the sawing table 20, even when the sawing table 20 is pivoted about the spindle 9. As in the previous illustrative embodiments, the anti-splintering member 34 is connected to a sensor 32 which is supported on the untoothed lateral surface of the saw blade 14. The sensor 32 is, for this purpose, arranged at a point of the anti-splintering member 34 which is close to the spindle and remote from the sawing table 20, or even on a corresponding bracket.

The anti-splintering member 34 can be displaceable in a groove in the sawing table 20, along the bearing surface thereof, or is pressed onto the workpiece by means of a spring 54' supported on the housing 8, so that it always rests flat. The rod 11, for example, can serve to press the anti-splintering member 34 against the saw blade 14, in which case the rod 11 is of resilient design and is mounted on the housing 8 with prestress towards the saw blade 14. The positioning devices 3 and 11 are also, naturally, arranged in pairs to the left and right and adjacent to the saw blade 14, so that this is subjected resiliently to the effect of one anti-splintering member 34 on each side.

The positioning device could, of course, also be of different design. A control cam, for example, would be especially conceivable, extending parallel to the saw blade and guided along a control arm, one end of which bears the deflection guard 34. In this case the dimensions of the control cam and of the arm would have to be such that the deflection guard adopts the necessary position relative to the teeth of the saw blade emerging from the workpiece when the sawing table is adjusted. Another possible embodiment offers a prestressed cable pull by which the deflection guard is set.

In summary, it may be stated that the proposed anti-splintering device or the deflection guard system can be employed with hand-operated circular saw, keyhole saws, stationary saws or even industrial saws. The production costs of the anti-splintering device are minimal, since it can be assembled from separate components, which are then operationally connected to a hand-operated circular saw. The splintering of the material is prevented directly at the saw tooth, so that no parallel guidance of the sawing table is required. The complete deflection guard with sensor is resiliently guided on the saw blade so that no gap is formed between the saw teeth and the deflection guard. The sensor can, however, also be retrospectively adjusted as required.

A further advantage of the proposed anti-splintering device resides in the fact that it can also be attached underneath the sawing table. As a result, splintering is prevented even if there are irregularities of the workpiece surface. In this arrangement, it is advantageous to attach the anti-splintering device resiliently to the sawing machine. The sensor and anti-splintering member are mouldings which can easily be replaced and are economical to produce.

It will be understood that each of the elements described above, or two or more together, may also find a useful application in other types of constructions differing from the types described above.

While the invention has been illustrated and described as embodied in an anti-splintering device for sawing machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An anti-splintering system for a sawing machine having a rotatable saw blade with an axis of rotation and a plurality of teeth, the anti-splintering system comprising an anti-splintering device positionable on a workpiece laterally from the saw blade in pressure contact with the saw blade in a region of the teeth of the saw blade; and at least one positioning device connectable to the sawing machine and supporting said anti-splintering device for a correct operational arrangement of said anti-splintering device in the event of a change in at least one of a cutting depth and an angle of inclination of the saw blade relative to the workpiece.

2. An anti-splintering system as defined in claim 1, wherein said anti-splintering device is radially adjustable relative to the saw blade and fixable in an adjusted position; and further comprising means for adjusting said anti-splintering device relative to the saw blade and fixing said anti-splintering device in the adjusted position.

3. An anti-splintering system as defined in claim 1, wherein said anti-splintering device is adjustable as to a pressure exerted on the saw blade; and further comprising means for adjusting said anti-splintering device as to the pressure exerted on the saw blade.

4. An anti-splintering system as defined in claim 1, wherein said anti-splintering device has a plug part which is detachably connectable to the sawing machine and has two anti-splintering members arranged laterally from the saw blade and bringable into pressure contact with the saw blade.

5. An anti-splintering system as defined in claim 4, wherein said anti-splintering members are articulately connected with said plug part.

6. An anti-splintering system as defined in claim 4, wherein said anti-splintering members are provided with sensors in a region of contact with the saw blade.

7. An anti-splintering system as defined in claim 4, wherein said anti-splintering members are parts which are offset relative to one another in steps and composed of cuttable material.

8. An anti-splintering system as defined in claim 1; and futher comprising means for articulately connecting said anti-splintering device to the sawing machine pivotally to at least one of an axis of the saw blade and an axis parallel to the axis of the saw blade.

9. An anti-splintering system as defined in claim 1, wherein said anti-splintering device has a radial outer side inclined toward the saw blade.

10. An anti-splintering system for a sawing machine having a saw blade with a plurality of teeth, the anti-splintering system comprising an anti-splintering device positionable on a workpiece laterally from the saw blade in pressure contact with said saw blade in a region of the teeth; and at least one positioning device connectable to the sawing machine and supporting said anti-splintering device for a correct operational arrangement of said anti-splintering device in the event of a change in at least one of a cutting depth and an angle of inclination of the saw blade relative to the workpiece, said anti-splintering device having a part which is in pressure contact with the teeth of the saw blade and is formed as an anti-splintering member, and a sensor which is in pressure contact with a body of the saw blade and supports said anti-splintering member.

11. An anti-splintering system as defined in claim 10, wherein said sensor and said anti-splintering member are adjustable in an axial direction of the saw blade.

12. An anti-splintering system as defined in claim 10, wherein said anti-splintering member is adjustable relative to said sensor, said sensor being formed as a dog of said anti-splintering member.

13. An anti-splintering system as defined in claim 10, wherein said sensor is composed of a bearing material, said anti-splintering member being composed of a material with a hardness lower than a hardness of the teeth of the saw blade.

14. An anti-splintering system for a sawing machine having a saw blade with a plurality of teeth, the anti-splintering system comprising an anti-splintering device positionable on a workpiece laterally from the saw blade in pressure contact with said saw blade in a region of the teeth; at least one positioning device connectable to the sawing machine and supporting said anti-splintering device for a correct operational arrangement of said anti-splintering device in the event of a change in at least one of a cutting depth and an angle of inclination of the saw blade relative to the workpiece, said anti-splintering device having a plug part which is detachably connectable to the sawing machine and has two anti-splintering members arranged laterally from the saw blade and bringable into pressure contact with the saw blade; and at least one spring element which interacts with said anti-splintering members and tends to bring said anti-splintering members into pressure contact with the saw blade.

15. An anti-splintering system for a sawing machine having a saw blade with a plurality of teeth, the anti-splintering system comprising an anti-splintering device positionable on a workpiece laterally from the saw blade in pressure contact with said saw blade in a region of the teeth; and at least one positioning device connectable to the sawing machine and supporting said anti-splintering device for a correct operational arrangement of said anti-splintering device in the event of a change in at least one of a cutting depth and an angle of inclination of the saw blade relative to the workpiece, said positioning device being shaped as an arm which is adjustable along a curve extending in a plane perpendicular to a spindle of the saw blade.

16. An anti-splintering system as defined in claim 15, wherein said anti-splintering device is cylindrical and has a radius, a spindle of said arm being located from the spindle of the saw blade a distance which corresponds to said radius of said cylindrical anti-splintering device.

17. An anti-splintering system as defined in claim 15, wherein a spindle of said arm defines together with said spindle of said saw blade a plane extending perpendicularly to a workpiece surface.

18. An anti-splintering system for a sawing machine having a saw blade with a plurality of teeth, the anti-splintering system comprising an anti-splintering device positionable on a workpiece laterally from the saw blade in pressure contact with said saw blade in a region of the teeth; and at least one positioning device connectable to the sawing machine and supporting said anti-splintering device for a correct operational arrangement of said anti-splintering device in the event of a change in at least one of a cutting depth and an angle of inclination of the saw blade relative to the workpiece, said anti-splintering device being shaped as a section of a cylinder, is rotatable about a spindle, and composed of a cuttable material.

19. An anti-splintering system for a sawing machine having a saw blade with a plurality of teeth, the anti-splintering system comprising an anti-splintering device positionable on a workpiece laterally from the saw blade in pressure contact with said saw blade in a region of the teeth; and at least one positioning device connectable to the sawing machine and supporting said anti-splintering device for a correct operational arrangement of said anti-splintering device in the event of a change in at least one of a cutting depth and an angle of inclination of the saw blade relative to the workpiece, said anti-splintering device having a cylindrical recess which is open toward the saw blade.

* * * * *